United States Patent
Lo

(10) Patent No.: US 10,906,360 B2
(45) Date of Patent: Feb. 2, 2021

(54) TIRE FOR BICYCLE TUBELESS WHEEL

(71) Applicant: CHENG SHIN RUBBER IND. CO., LTD., Chang-Hwa (TW)

(72) Inventor: Tsai Jen Lo, Chang-Hwa (TW)

(73) Assignee: Cheng Shin Rubber Industrial Co., Ltd., Tasuen (TW)

( * ) Notice: Subject to any disclaimer, the term of this patent is extended or adjusted under 35 U.S.C. 154(b) by 570 days.

(21) Appl. No.: 15/589,037

(22) Filed: May 8, 2017

(65) Prior Publication Data

US 2018/0319221 A1 Nov. 8, 2018

(51) Int. Cl.
*B60C 15/02* (2006.01)
*B60C 15/024* (2006.01)

(52) U.S. Cl.
CPC ........ *B60C 15/0242* (2013.01); *B60C 15/024* (2013.01); *B60C 2015/0245* (2013.01); *B60C 2200/12* (2013.01)

(58) Field of Classification Search
CPC ... B60C 15/02; B60C 15/023; B60C 15/0226; B60C 15/024; B60C 15/0242; B60C 2200/12
See application file for complete search history.

(56) References Cited

U.S. PATENT DOCUMENTS

| | | | | |
|---|---|---|---|---|
| 6,155,651 | A * | 12/2000 | Mizata | B60B 1/041 152/381.6 |
| 6,257,676 | B1 * | 7/2001 | Lacombe | B60B 1/003 301/58 |
| 2004/0187995 | A1 * | 9/2004 | Yoshinaka | B60C 3/04 152/454 |
| 2010/0230025 | A1 * | 9/2010 | Kawai | B60C 5/02 152/501 |

FOREIGN PATENT DOCUMENTS

| | | | | |
|---|---|---|---|---|
| FR | 3014744 | A1 * | 6/2015 | ......... B60C 15/0242 |
| JP | 2004017778 | A * | 1/2004 | ............ B60C 15/00 |

OTHER PUBLICATIONS

Machine translation of JP2004-017778 (no date).*

* cited by examiner

*Primary Examiner* — Justin R Fischer
*Assistant Examiner* — Philip N Schwartz
(74) *Attorney, Agent, or Firm* — Rosenberg, Klein & Lee

(57) ABSTRACT

A bicycle tubeless tire includes a tread and two sidewalls are formed on two sides of the tread. Each sidewall has a lip formed on the distal edge thereof. An installation unit is integrally formed with each lip. Each lip includes an inside, an underside and an outside. The underside and the outside of each lip are engaged with an engaging portion at the inner bottom of the rim when the tire is installed to the rim. The lips do not shift by the engaging portions of the rim. Each of the underside and the outside is a flat side such that the contact area between the lips and the rim is increased to have better air-tight features. The outer face of each lip is a flat face to be installed to the rim without flanges. The deformation of the sidewalls of the tire, and the wind resistance are reduced.

8 Claims, 8 Drawing Sheets

TIRE FOR BICYCLE TUBELESS WHEEL

BACKGROUND OF THE INVENTION

1. Fields of the Invention

The present invention relates to a tire for bicycles, and more particularly, to a tire used for bicycle tubeless wheels and the tire has increased volume and is durable.

2. Descriptions of Related Art

The conventional bicycle wheels generally comprise a rim and a tire is connected to the outer periphery of the rim. The tires of the bicycle wheels can be a tube or a clincher, wherein the tube has O-shaped cross section, and the clincher includes a U-shaped cross section which includes two sidewalls and a lip is formed on each of the sidewalls. The clincher can be catalogued to be tube type or tubeless type.

The bicycle wheel rims includes a circular part with a hub located at the center of the circular part, and multiple spokes are connected between the inner periphery of the circular part and the hub. The rim cooperated with a clincher includes two sidewalls extending from two sides along the outer periphery thereof such that the lips of the tire are engaged with the two sidewalls. There is no tube located between the clincher and the rim so that the lips are required to be air-tightly connected to the sidewalls of the rim.

For the tubeless wheel, air is introduced into the space between the tire and the rim, so that the connection between the rim and the tire is high so as to avoid leakage from any possible gap between the tire and the rim. That is to say, the engagement between the lips of the tire and the rim has to be air-tight.

Generally, the convention rim includes a flange extending from each of the sidewalls of the rim so as to be engaged with the lips of the tire. Nevertheless, the rim with the flanges requires higher manufacturing cost, especially when the rim is made of carbon-fibers. Besides, the flanges cause concentration of stress when braking. Furthermore, in order to be engaged with the flanges, the sidewalls of the tire have to be deformed severely and the deformation causes wind resistance when in use.

The present invention intends to provide a tire for bicycle tubeless wheel, and the tire eliminates the shortcomings mentioned above.

SUMMARY OF THE INVENTION

The present invention relates to a bicycle tubeless tire and comprises a tire having a U-shaped cross section and a tread. Two sidewalls are formed on two sides of the tread. Each sidewall has a lip formed on the distal edge thereof. An installation unit is integrally formed with each lip. Each lip has an inside, an underside and an outside. Each of the underside and the outside is a flat side. The outside is perpendicular to the axis of the rim to which the tire is installed thereto. An outer face is formed between the outside and the sidewall. The sidewall, the outside and the outer face are not located on the same plane. A first engaging ridge protrudes from the connection portion between the sidewall and the outer face. A toe is formed at the connection portion between the inside and the underside. The first engaging ridge is engaged with the top surface of the rim. The toe is engaged with an engaging portion on the inner bottom of the rim.

The primary object of the present invention is to provide a tire which is suitable for being installed to a bicycle wheel rim that does not have a flange extending from its sidewalls.

Another object of the present invention is to provide a tire, wherein the underside and the outside of each lip of the tire are engaged with an engaging portion at the inner bottom of the rim when the tire is installed to the rim, such that the lips of the tire dot not shift.

Yet another object of the present invention is to provide a tire wherein the underside and the outside of each lip are a flat face. The contact area between the lips and the rim is increased to have better air-tight features.

A further object of the present invention is to provide a tire wherein the outer face of each lip is a flat face. The tire is suitable for being installed to a rim that does not have any flange extending from the sidewalls thereof. The deformation of the sidewalls of the tire is reduced, and the wind resistance is reduced.

The present invention will become more apparent from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
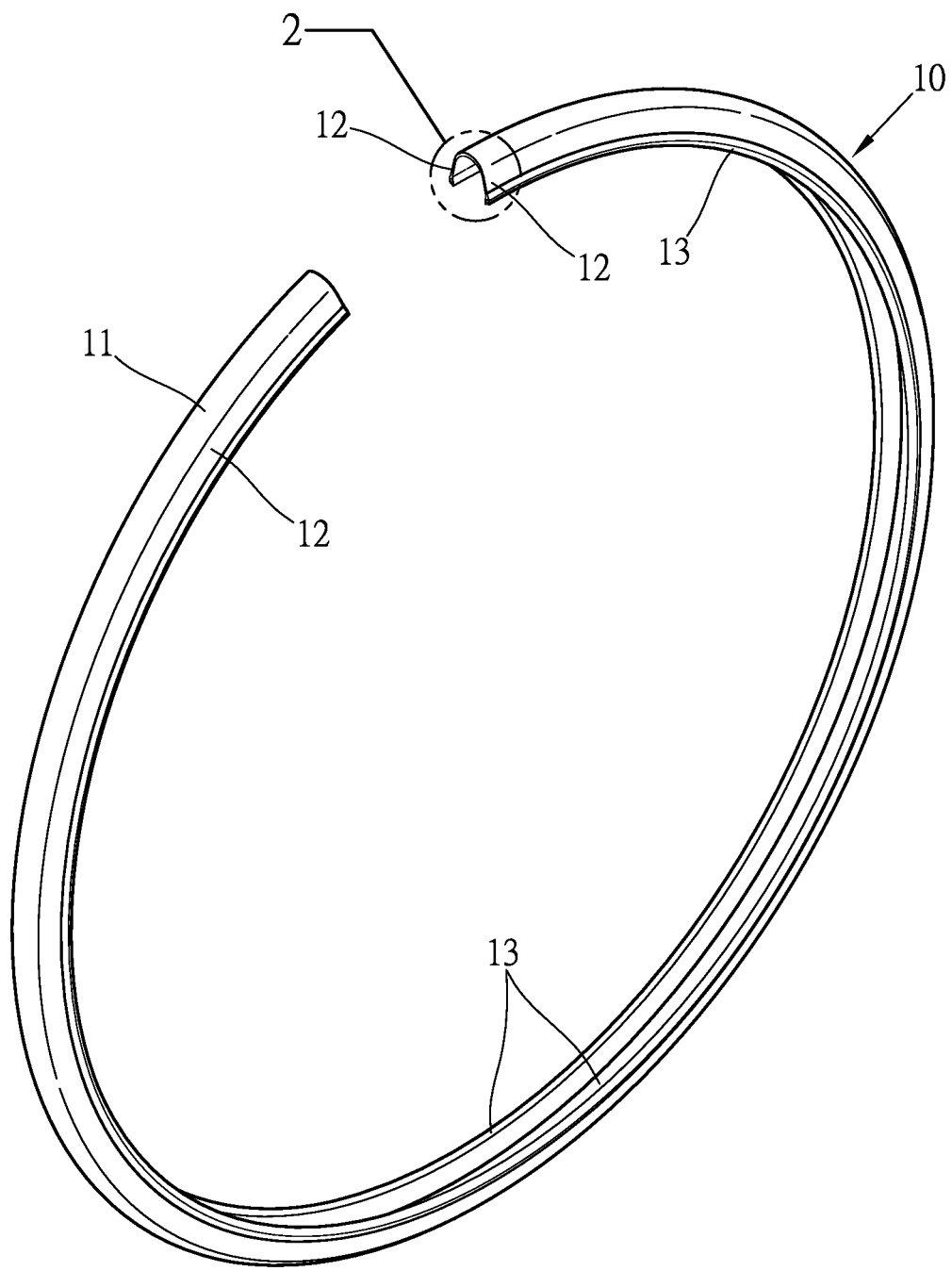
FIG. 1 shows the tire of the present invention.
Figure 2:
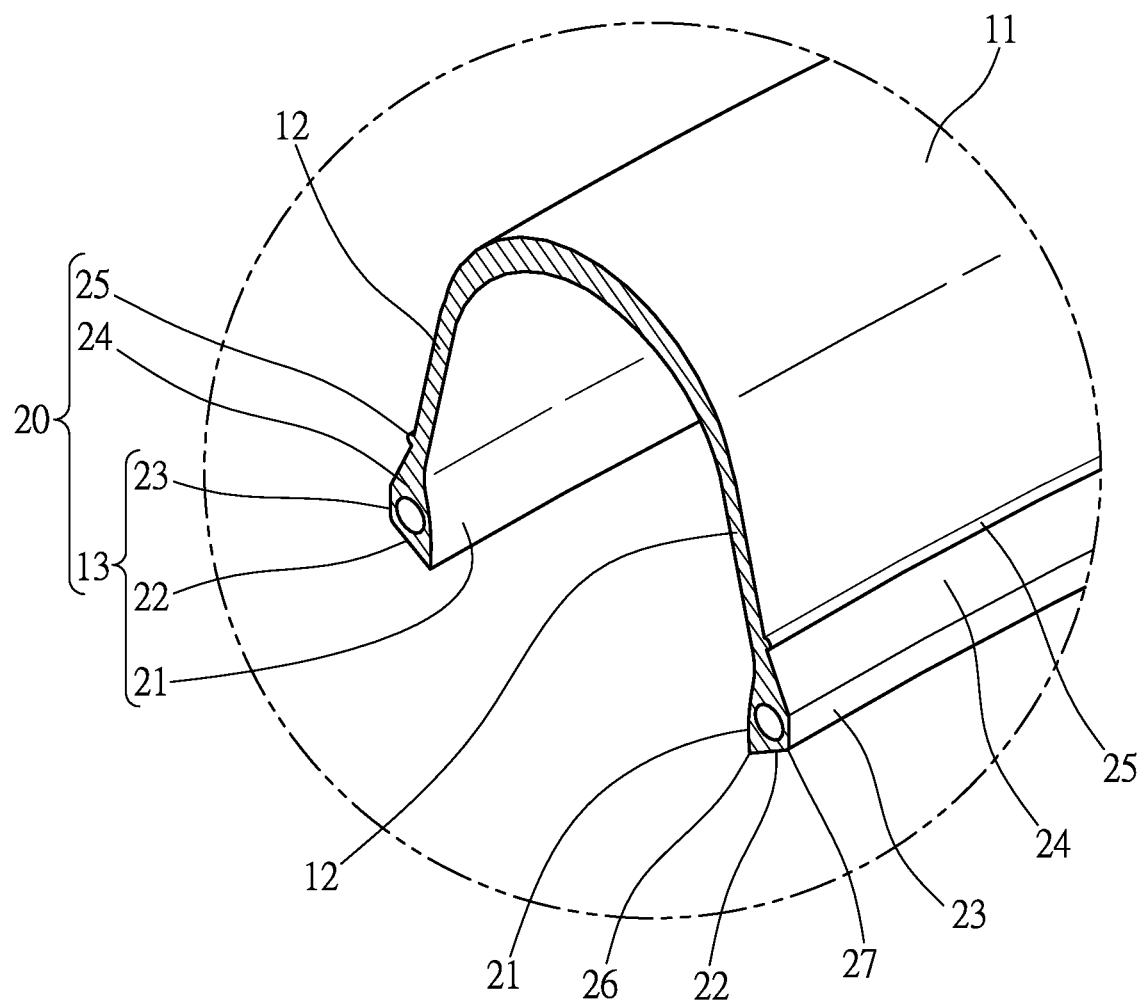
FIG. 2 shows the cross section of the tire of the present invention.
Figure 3:
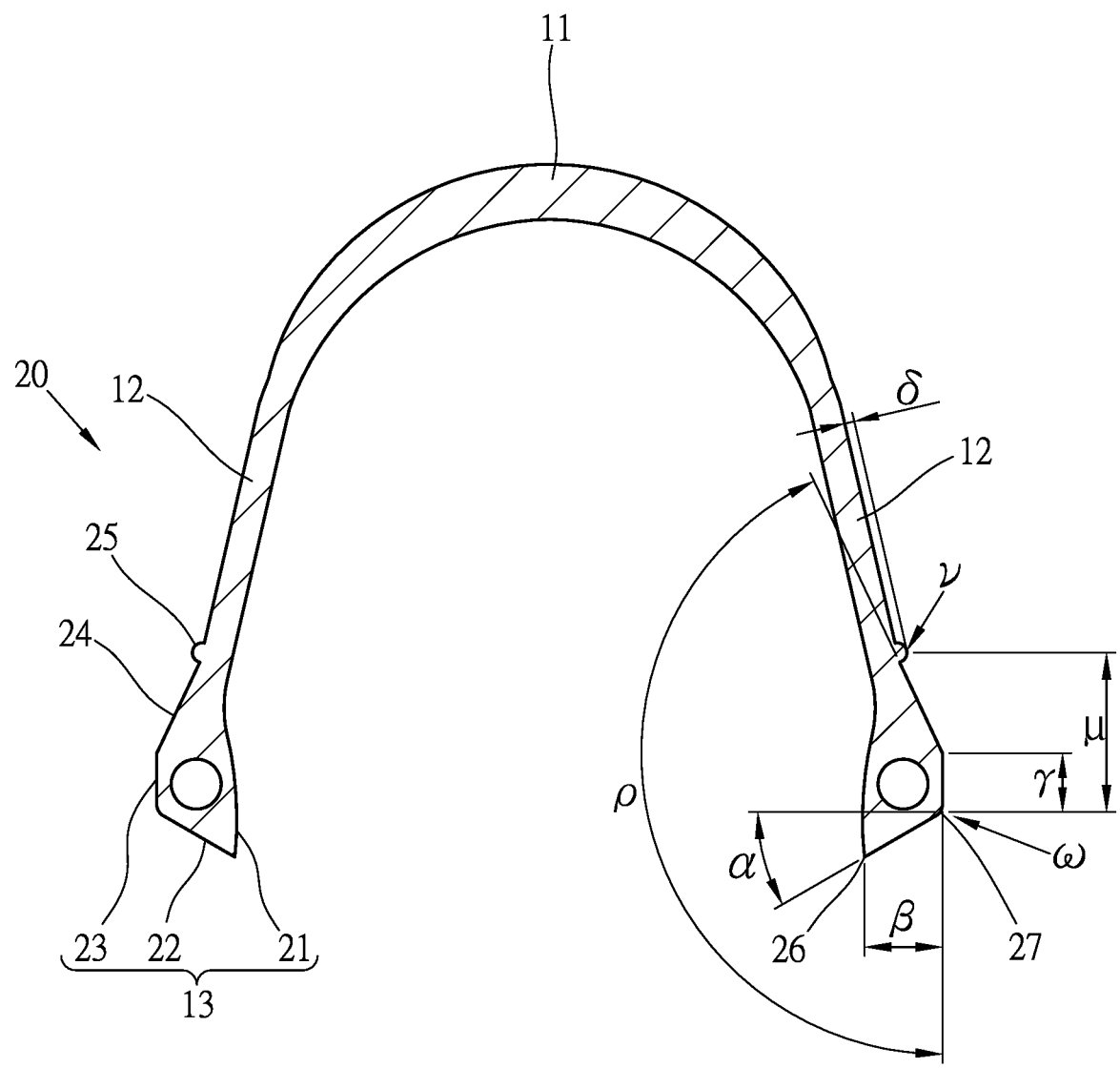
FIG. 3 is a cross section of the tire of the present invention.
Figure 4:
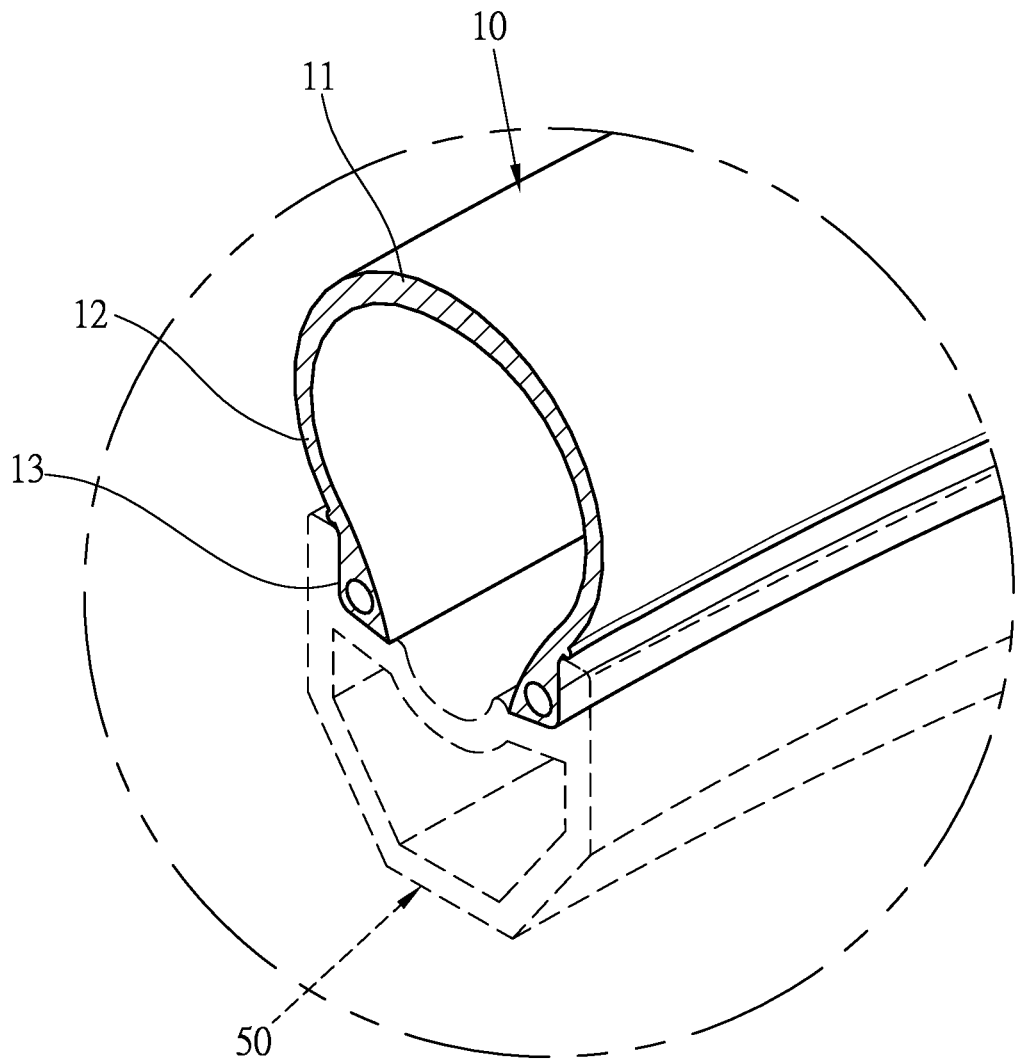
FIG. 4 shows that the tire of the present invention is installed to a rim.

Referring to FIGS. 1 to 3, the tire 10 of the present invention comprises a U-shaped cross section and has a tread 11, and two sidewalls 12 are formed on two sides of the tread 11. Each sidewall 12 has a lip 13 formed on the distal edge thereof.

An installation unit 20 is integrally formed with each lip 13. Each lip 13 comprises an inside 21, an underside 22 and an outside 23. When the tire 10 is installed to a rim 50, the outsides 23 are in vertical direction. In other words, the outsides 23 are perpendicular to the axis of the rim 50 when the tire 10 is installed to the rim 50. Each of the underside 22 and the outside 23 is a flat side. An outer face 24 which is a flat face and formed between the outside 23 and the sidewall 12. The sidewall 12, the outside 23 and the outer face 24 are not located on the same plane. A first engaging ridge 25 integrally protrudes from the connection portion between the sidewall 12 and the outer face 24. A toe 26 is formed at the connection portion between the inside 21 and the underside 22. A first edge 27 is formed between the underside 22 and the outside 23. The rim 50 includes two sidewalls 53 and each sidewall has a top face 51. Two seats 54 are formed in the inner bottom of the rim 50 and a bridge is connected between the two seats 54 as disclosed FIGS. 4 to 7. Two engaging portions 52 protrude from the two seats 54 respectively. When installing the tire 10 to the rim 50, the first engaging ridges 25 are engaged with the top faces 51 of the rim 50. The undersides 22 of the lips 13 of the tire 10 are matched with the seats 54 of the rim 50, and the toes 26 of the tire 10 are engaged with the engaging portions 52, such that the lips 13 do not shift.

The tire 10 of the present invention is suitable for being installed to the rim 50 that does not have any flange extending from the sidewalls thereof.

Specifically, as shown in FIG. 3, an angle α of 0 to 45 degrees is defined between the underside 22 and a horizontal plane. The underside 22 of each lip 13 has a width β of 2 to 8 mm. The outside 23 is formed with the outer surface of the sidewall 12, and a thickness difference δ of 0 to 1 mm is formed between the outside 23 and the outer surface of the sidewall 12. The outside 23 is thicker than the sidewall 12. The outside 23 has a height γ of 1 to 6 mm A rounded corner ω of 0.3 to 1.5 mm is defined at the connection portion between the underside 22 and the outside 23. An obtuse angle ρ of 135 to 180 degrees is defined between the outside 23 and the outer face 24. A vertical height μ of 6 to 9 mm is formed between the first edge 27 and the first engaging ridge 25.

Figure 5:
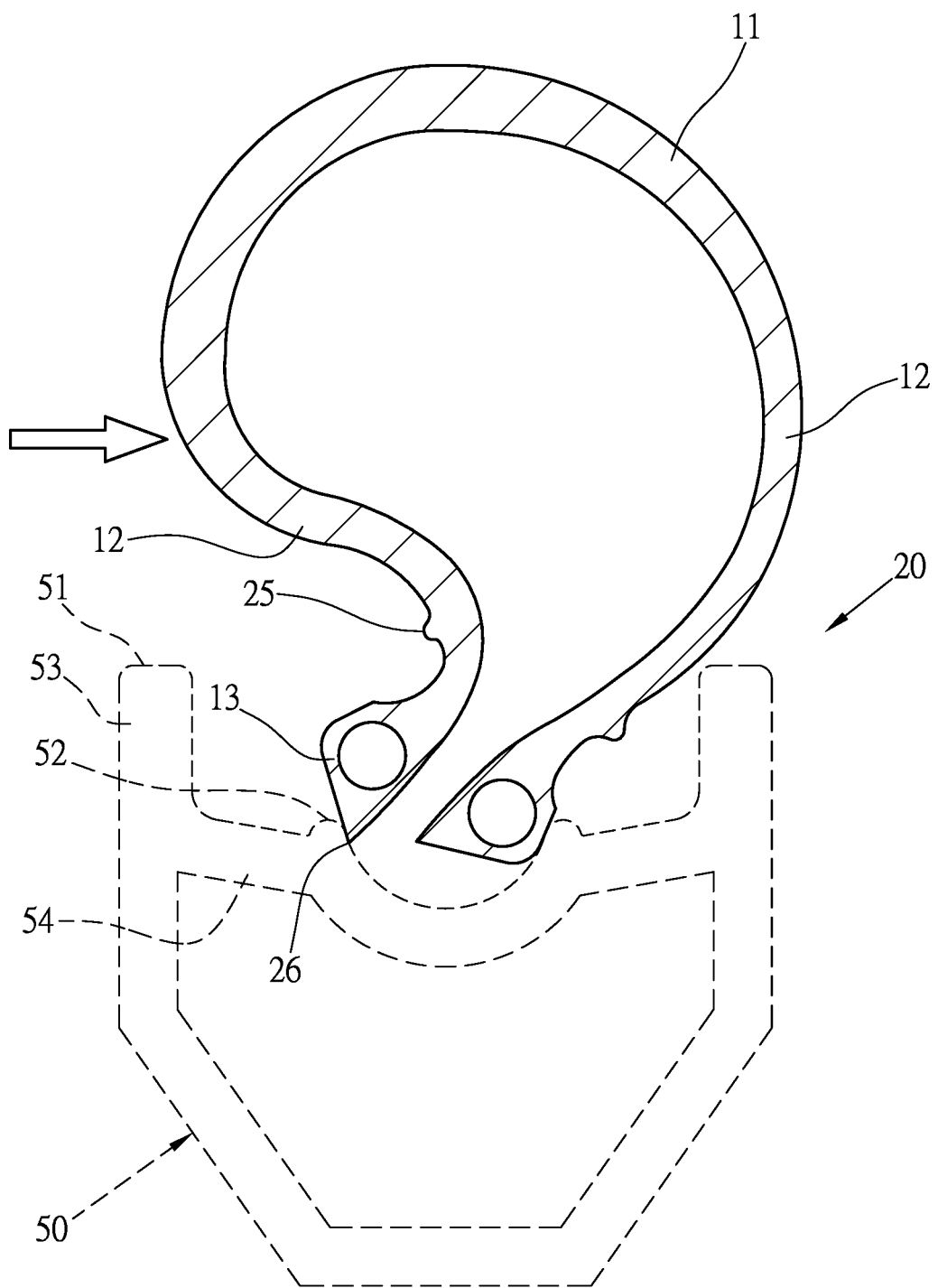
FIGS. 5 to 7 show steps of the installation of the tire of the present invention to the rim.
Figure 6:
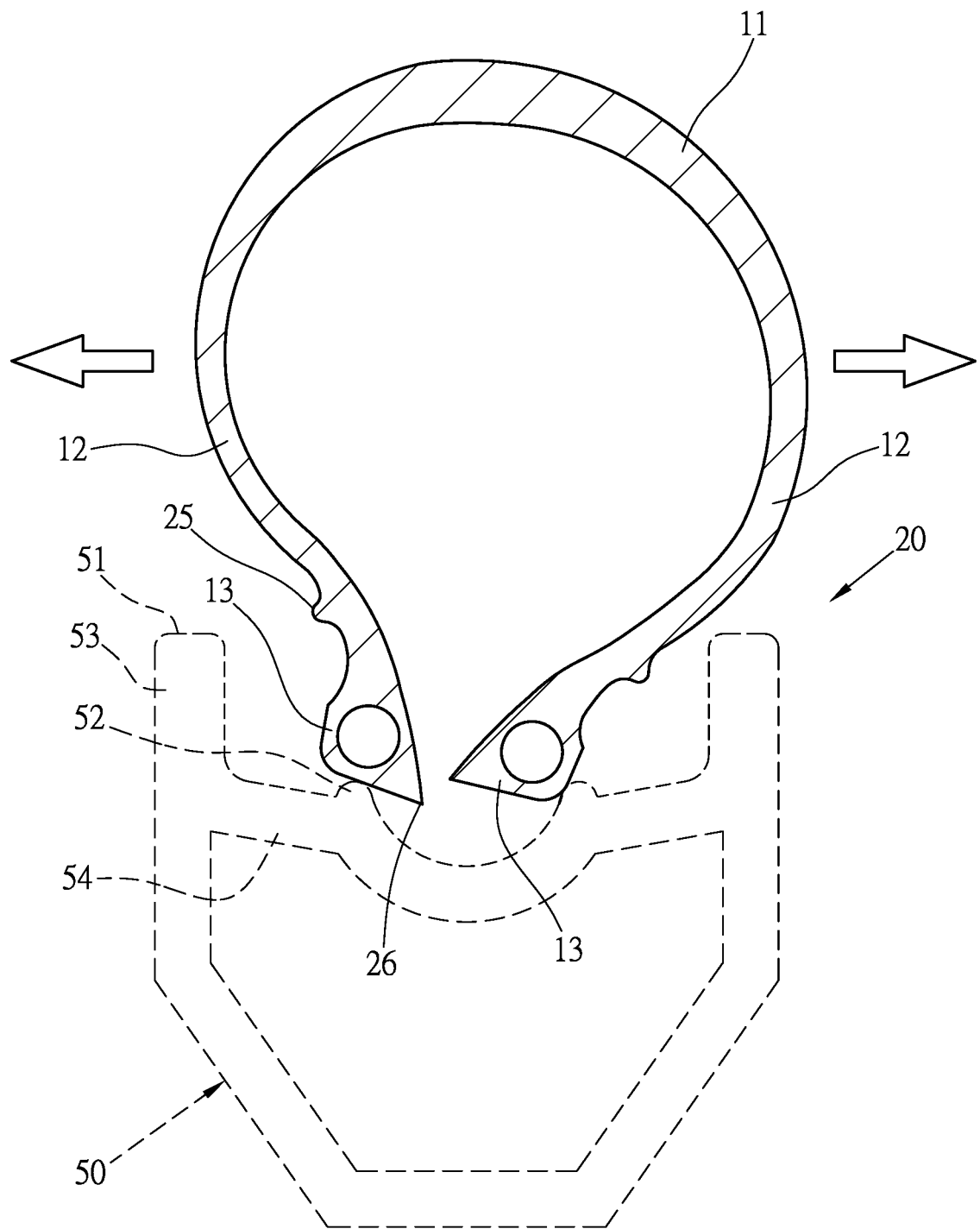
Figure 7:
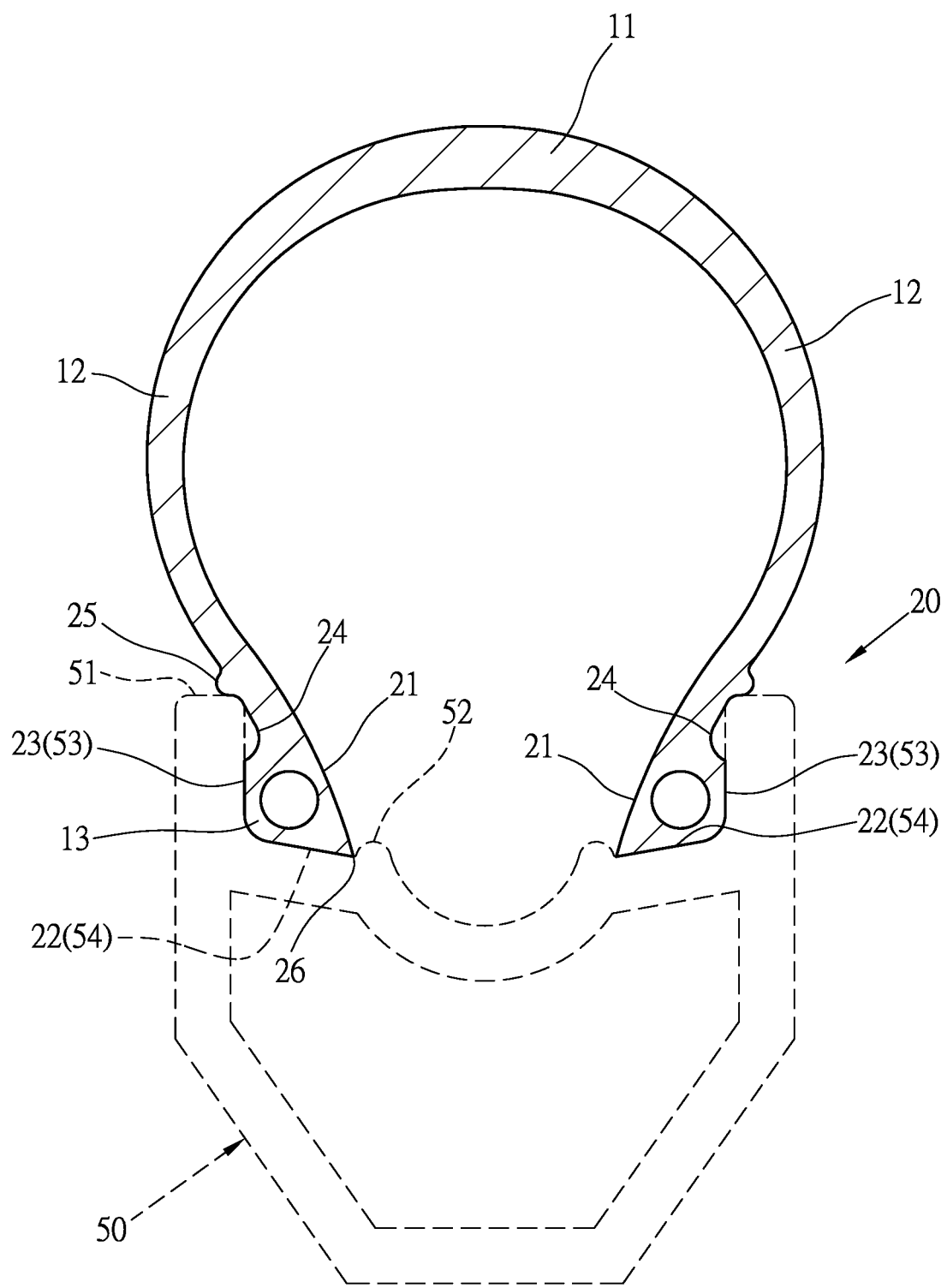

As shown in FIGS. 5 to 7, when the tire 10 is installed to the rim 50 as shown in phantom lines, the rim 50 includes two sidewalls 53 and the inside of each sidewall of the rim 50 is a flat inside. There is not any flange extending from the sidewalls 53 of the rim 50. Each sidewall 53 has a top face 51. Two seats 54 are formed in the inner bottom of the rim 50 and a bridge is connected between the two seats 54. Two engaging portions 52 protrude from the two seats 54 respectively.

One sidewall 12 of the tire 10 is positioned inside of rim 50, and the other sidewall 12 of the tire 10 is deformed by applying a force thereto and positioned inside of the rim 50 as shown in FIG. 6. The tire 10 is inflated so that the two sidewalls 12 of the tire 10 expand and move toward the sidewalls 53 of the rim 50. As shown in FIG. 7, when the tire 10 is inflated completely, the tire 10 is secured to the inside of the rim 50. The toes 26 contact the engaging portions 52. The first engaging ridges 25 are engaged with the top faces 51 of the sidewalls 53 of the rim 50. The underside 22 and the outside 23 of each lip 13 of the tire 10 are fully matched with the sidewall 53 and the seat 54. Because the outsides 23 each are a flat side so that when the tire 10 is inflated, the outsides 23 are matched with the sidewalls 53 at a large contact area. The undersides 22 of each lip 13 is a flat face so that the undersides 22 are matched with the seats 54 when the tire 10 is inflated.

The advantages of the present invention includes the following advantages which are that the sidewalls 53 of the rim 50 each have flat inside and outside, and there is no flange extending from the sidewalls 53 of the rim 50, the structure of the rim 50 becomes simple and easily to be manufactured.

When the tire 10 is inflated, the first engaging ridges 25 are engaged with the top faces 51 of the sidewalls 53 of the rim 50. The toes 26 of the tire 10 are engaged with the engaging portions 52 of the rim 50, so that the tire 10 is securely installed to the rim 50.

When the tire 10 is installed to the rim 50 and inflated completely, the underside 22 and the outside 23 of each lip 13 of the tire 10 are fully matched with the sidewall 53 and the seat 54. The contact area between the underside 22 and the outside 23 of the tire 10 and the sidewall 53 and the seat 54 of the rim is sufficient so as to have better air-tight features.

The outer face 24 of each lip 13 is a flat face and which is properly bent when the tire 10 is inflated because the rim 50 does not have any flange extending therefrom. The wind resistance of the wheel is reduced.

Because the sidewalls 53 of the rim 50 have a flat inside and outside, there is no flange extending from the sidewalls 53, so that the installation of the tire 10 to the rim 50 is easily and quick.

When the tire 10 is broken, because the sidewalls 53 of the rim 50 do not have any flange, so that the tire 10 can be easily removed from the rim 50. The lips 13 of the tire 10 and the sidewalls 53 of the rim 50 are not easily damaged, so that the life of the tire 10 and the rim 50 is prolonged.

Figure 8:
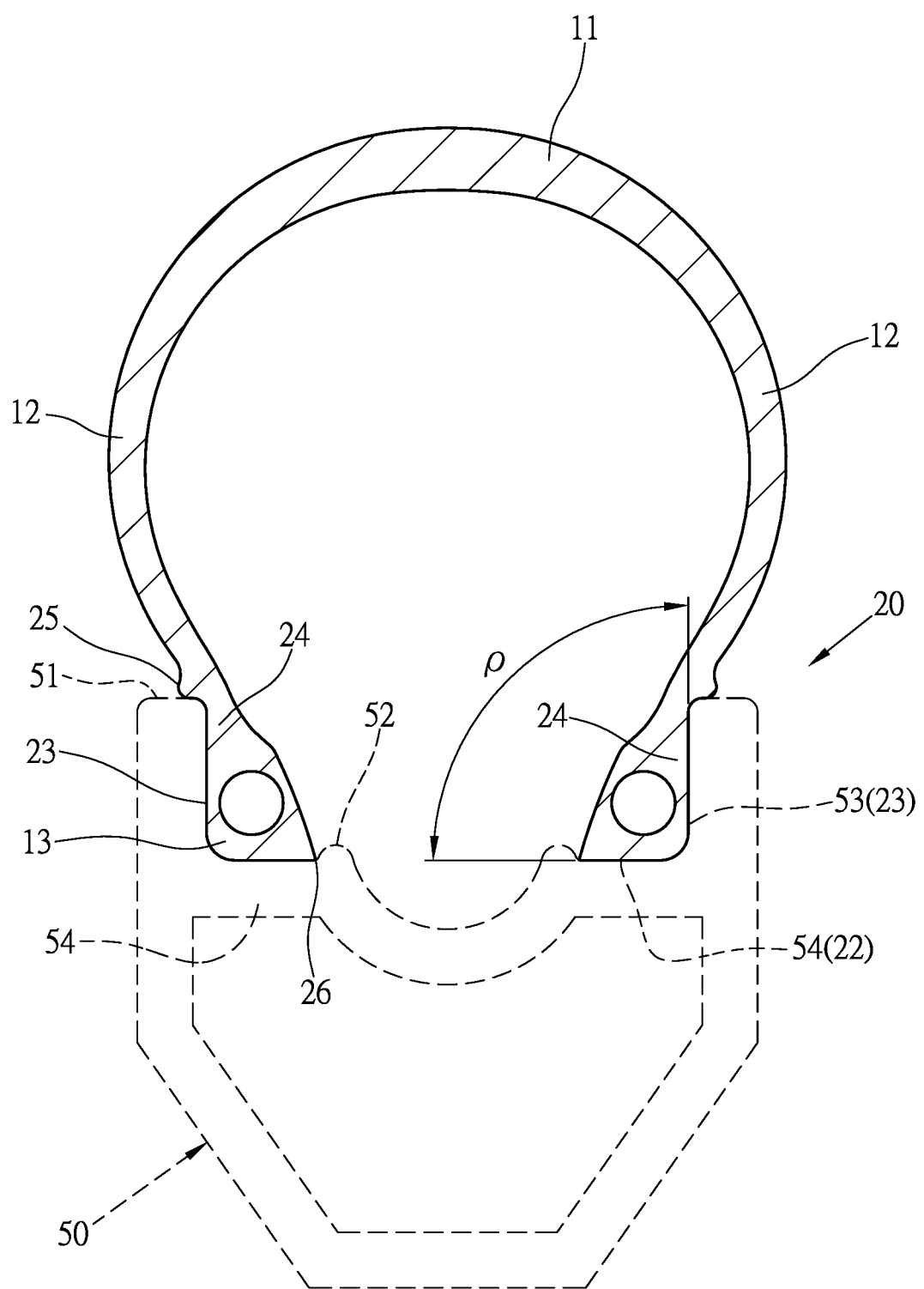
FIG. 8 shows that the tire of the present invention is installed to another rim.

As shown in FIG. 8, the angle α between the seats 54 and the sidewalls 53 is 90 degrees. The underside 22 and the outside 23 of the tire 10 can still matched with the sidewall 53 and the seat 54 of the rim 50.

While we have shown and described the embodiment in accordance with the present invention, it should be clear to those skilled in the art that further embodiments may be made without departing from the scope of the present invention.

What is claimed is:

1. A bicycle tubeless tire, comprising:
a tire having a U-shaped cross section, the tire including a tread and two sidewalls formed on two sides of the tread, each sidewall having a lip formed on a distal edge thereof; and
an installation unit integrally formed with each lip, each lip having an inside, an underside, and an outside, each of the underside and the outside being a flat side, each outside being perpendicular to an axis of a rim when the tire is adapted to be installed to the rim, an outer face formed between the outside and the corresponding sidewall, each of the outside, the outer face, and the corresponding sidewall defining a planar face located on different planes relative to one another, the underside and the outside together defining a first convex edge, the inside and the underside together defining a second convex edge, the outside and the outer face together defining a third convex edge, the outer face and the corresponding sidewall together defining a concave edge, a first engaging ridge protruding from a connection portion between the outer face and the corresponding sidewall, a toe formed at a connection portion between the inside and the underside, the first engaging ridge configured to engage a flat top face of the rim, the toe configured to engage a corresponding engaging portion on an inner bottom of the rim.

2. The bicycle tubeless tire as claimed in claim 1, wherein an angle of 0 to 45 degrees is defined between the underside and a horizontal plane.

3. The bicycle tubeless tire as claimed in claim 1, wherein the underside has a width of 2 to 8 mm.

4. The bicycle tubeless tire as claimed in claim 1, wherein a side portion of the outside is formed with an outer surface of the corresponding sidewall, a thickness difference of 0 to 1 mm is formed between the side portion of the outside and the outer surface of the corresponding sidewall.

5. The bicycle tubeless tire as claimed in claim 1, wherein a side portion of the outside is formed with an outer surface of the corresponding sidewall, a thickness difference is formed between the side portion of the outside and the outer surface of the corresponding sidewall, the outside is thereby thicker than the corresponding sidewall, the outside has a height of 1 to 6 mm.

6. The bicycle tubeless tire as claimed in claim 1, wherein the first convex edge is rounded to form a rounded corner of 0.3 to 1.5 mm.

7. The bicycle tubeless tire as claimed in claim 1, wherein the third convex edge defines an obtuse angle between 135 and 180 degrees.

8. The bicycle tubeless tire as claimed in claim 1, wherein a vertical height of 6 to 9 mm is formed between the first convex edge and the first engaging ridge.

\* \* \* \* \*